United States Patent [19]

Summer

[11] 4,093,916
[45] June 6, 1978

[54] DIGITAL TACHOMETER

[76] Inventor: Steven E. Summer, 37 View Rd., Setauket, N.Y. 11785

[21] Appl. No.: 729,212

[22] Filed: Oct. 4, 1976

[51] Int. Cl.² .............................................. G01P 3/48
[52] U.S. Cl. ................................. 324/166; 235/92 CC; 235/92 FQ
[58] Field of Search .................. 324/166, 16 R, 78 D; 235/92 FQ, 92 CC; 340/347 AD

[56] References Cited
U.S. PATENT DOCUMENTS

| | | | |
|---|---|---|---|
| 3,748,533 | 7/1973 | South | 324/166 X |
| 3,808,407 | 4/1974 | Ratz | 235/92 FQ |
| 3,852,574 | 12/1974 | Bilgutay et al. | 235/92 FQ X |
| 3,868,570 | 2/1975 | Kopera, Jr. | 324/166 |
| 3,962,567 | 6/1976 | Oicles et al. | 235/92 FQ X |
| 3,986,009 | 10/1976 | Fastaia | 324/16 R X |
| 4,007,419 | 2/1977 | Jasmine | 324/166 |

Primary Examiner—Rudolph V. Rolinec
Assistant Examiner—Vincent J. Sunderdick
Attorney, Agent, or Firm—Joseph F. Padlon

[57] ABSTRACT

A digital tachometer arrangement in which pulses resulting from rotation of a shaft, are counted over a predetermined time interval. The time interval is established by counting pulses from a high frequency oscillator. The counting of pulses from the high frequency oscillator is begun only at a predetermined instant when the pulses from the rotating shaft attain a positive edge. Relating the beginning of the time interval precisely to a predetermine edge of the pulses from the rotating shaft, provides for a stabilized display which counts the pulses from the shaft during the preset time interval. The count of the pulses from the rotating shaft over the preset time interval, is proportional to the rotational speed of the shaft, and is displayed on a digital readout connected to a binary-coded decimal counter receiving pulses from the rotating shaft.

2 Claims, 1 Drawing Figure

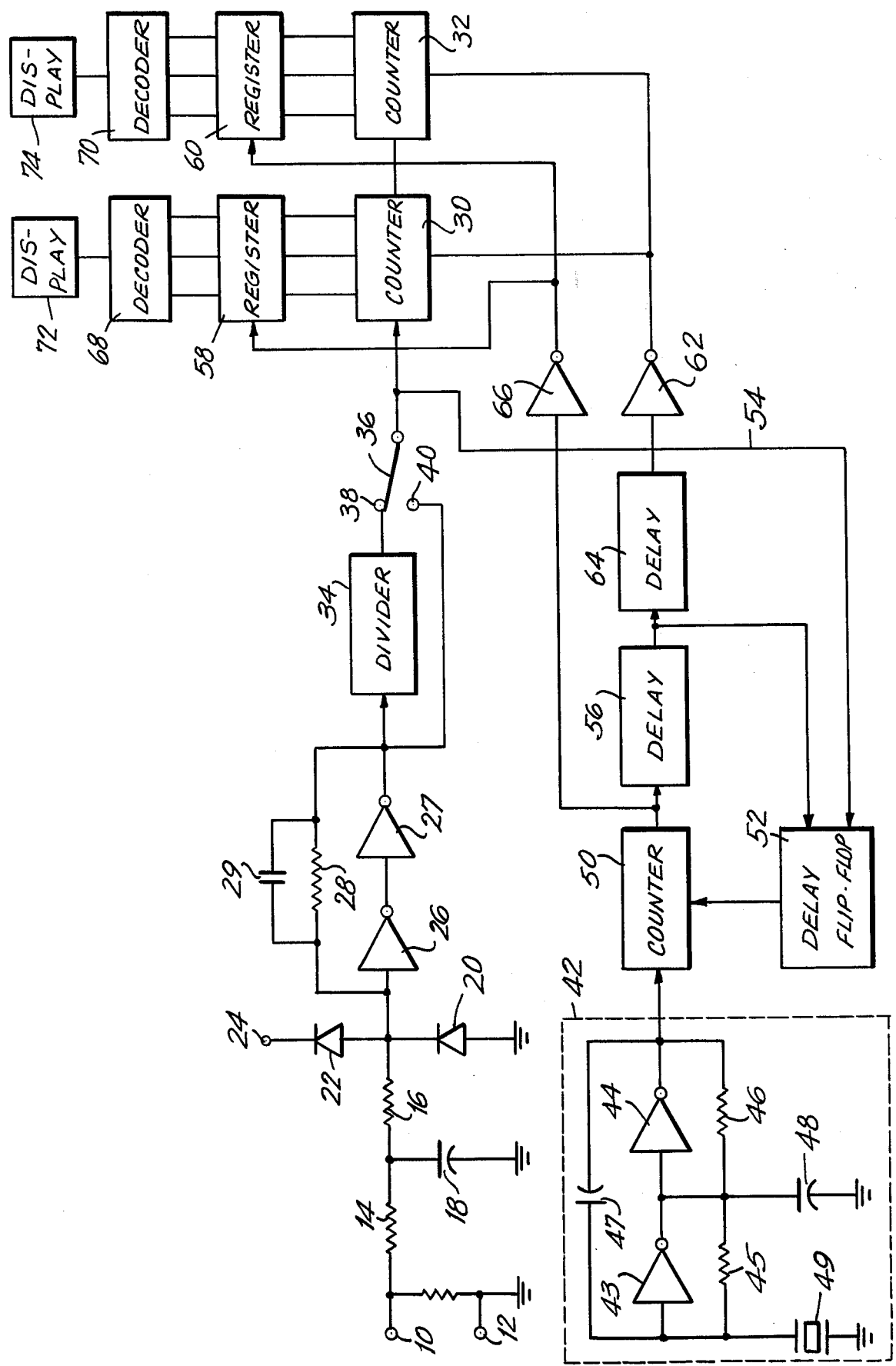

DIGITAL TACHOMETER

BACKGROUND OF THE INVENTION

In measuring the rotational speed of a shaft as, for example, an engine shaft, it is desirable to provide a digital display which indicates numerically the speed of the shaft in revolutions per minute, for example. To obtain such a digital readout of the shaft speed, pulses generated as a result of the rotation of the shaft, are counted over a predetermined time interval. The larger the number of pulses counted within that time interval, the higher is the speed of the shaft. Thus, the count of pulses within the time interval is proportional to the shaft speed.

If, however, the time interval during which the pulses are counted, is begun at an arbitrary instant in relation to the train of pulses generated from the rotating shaft, then an unstable display will result in the indication of the speed. This unstable condition is due to the possibility that within successive time intervals, the pulse count may vary by one pulse, for example, depending on the instant at which the time interval was begun in relation to the pulse train. When the digital readout has relatively few places of figures, such as two places, for example, the unstable condition is very disturbing to an observer since the last or lowest place of the figures in the digital readout will continuously change.

Accordingly, it is an object of the present invention to provide a digital tachometer which has a stable readout even when relatively few digits of places are used for indicating numerically relatively few digits or places are used for indicating numerically the speed of the shaft being measured.

It is another object of the present invention to provide a digital tachometer of the foregoing character, which is simple in construction and may be fabricated at substantially low cost.

A further object of the present invention is to provide a digital tachometer, as described, which may be economically maintained in service, and which has a substantially long operating life.

SUMMARY OF THE INVENTION

A digital tachometer in which pulses from the ignition system of an engine are applied to a binary-coded decimal counter during a predetermined time interval. This time interval is established by counting a predetermined number of pulses from a high frequency oscillator in the form of a piezoceramic or crystal resonator, for example. The time interval is related to the pulse train from the ignition system, so that the time interval is begun only at the instant when the pulse train exhibits a positive edge. The end of the time interval is established by means of a signal from a counter which counts pulses from the high frequency oscillator. The count of the pulses from the engine ignition system is transferred to a register for storage, and the amount in the register is decoded for purposes fo displaying the amount in decimal form on a digital readout. After the count in the binary-coded decimal counter has been transferred to the storage register, this counter becomes reset in preparation for receiving pulses during a subsequent new cycle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

An electrical schematic diagram showing the essential elements and components as well as their interconnections, in accordance with the present invention.

DESCRIPTION OF THE PREFERRED EMBODIMENTS

Referring to the drawing, pulses derived from the ignition system of an internal combustion engine, for example, are applied to terminals 10 and 12. Transients which may be present in the pulsed signal from the ignition system of the engine whose speed is to be measured, are eliminated in a low pass T-filter network consisting of resistors 14, 16 and capacitor 18. A clamping circuit consisting of diodes 20 and 22 protects the circuit of the present invention against excess voltage. Terminal 24 is, for this purpose, connected to a source of constant potential. A Schmitt trigger circuit which may be constructed of conventional components 26–29, serves to shape the pulses from the ignition system and to provide steep and sharp edges. These pulses are then applied to binary-coded decimal counters 30, 32 which serve to count the pulses over a predetermined time interval.

A divider 34 in the form of a counter, for example is provided to adapt the circuit to both eight-cylinder engines and four-cylinder engines. A switch 36 may be connected either to terminal 38 or terminal 40, depending on whether an eight-cylinder engine or a four-cylinder engine is being dealt with. The switch 36 may also be in the form of a permanent connection, for example, which is set in the factory, and then provides that the digital tachometer of the present invention is used either for eight-cylinder engines or four-cylinder engines.

The predetermined time interval during which the counters 30, 32 count pulses from the ignition system, is generated by means of a high frequency oscillator in the form of a piezoceramic or crystal resonator 42. The latter may be constructed of conventional elements 43–49, as well known in the art. Thus, by interconnecting amplifying elements 43, 44 with a crystal 49 in combination with resistors 45, 46 and capacitors 47, 48, high frequency pulses may be obtained in the conventional manner. These high frequency pulses are applied to a counter 50 which is a preset counter and provides an output signal after having attained a predetermined count. Since the pulses provided by the oscillator 42 are accurately spaced in time from each other, a predetermined count of these pulses represents a predetermined time interval.

The predetermined time interval established by the counter 50, however, is not started until a positive edge prevails in the pulse train obtained from the engine ignition system. For this purpose, a delay flip-flop 52 is provided, which has pulses from the ignition system applied to it by means of interconnecting line 54. The delay flip-flop 52 then actuates the counter 50 only at the instant when a positive edge occurs on the line 54. Thus, the counter 50 becomes actuated always at the same instant with respect to the pulse train derived from the ignition system of the engine whose speed is to be measured. Once the counter 50 is actuated, pulses from the oscillator 42 are counted. When a predetermined count has been obtained, representing the desired time interval, the counter 50 provides an output signal which resets the delay flip-flop 52 after having been delayed by the delay element 54. The resetting of element 52 causes the counter 50 to become also reset thereby. The counter 50 does not become reactuated only the element 52 detects the next positive edge in the pulse train from the ignition system. The delay element 54 is essential so that the output signal from the counter 50 can be used as a resetting signal also for the elements 52 and 50.

The output signal from the counter 50 is, furthermore, used to transfer the information in the counters 30, 32 to registers 58, 60 which serve to store the amounts counted. After the information from the counters 30, 32 has been transferred to registers 58, 60, respectively, these counters are reset by the pulse signal appearing at the output of amplifying element 62. This reset pulse signal for counters 30, 32 is derived from the output of the delay element 56, and is delayed further by the element 64 before being applied to the counters 30, 32. The delay element 64 assures that the counters 30, 32 will not be reset until their contents have been transferred to the respective registers 58, 60. Thus, the pulse signal for resetting the counters 30, 32 experiences two delays through the elements 56 and 64, whereas the pulse signal appearing at the output of amplifying element 66 for transferring the information from counters 30, 32, to registers 58, 60 is derived directly from the output of counter 50 and does not experience the delays of the resetting signal.

The contents in the registers 58, 60 are decoded in the conventional manner by decoders 68, 70 which drive digital displays, respectively, 72 and 74. For purposes of illustration, only two digits for figure places are shown in the drawing. The result can, however, be displayed by any number of desired digits or places, corresponding to any desired accuracy.

It is an essential provision of the present invention that the counter 50 does not become actuated by the element 52, until the instant at which a positive edge occurs in the pulse train from the ignition system. As a result, the time interval generated by the counter 50 in combination with the oscillator 42, commences consistently at precisely the same instant with respect to the pulse train derived from the ignition system. Accordingly, for a constant speed of the engine shaft, the same number of pulses will always be counted by the elements 30, 32 within the time interval set by the counter 50. In the absence of such a provision that the counter be started only at such a predetermined instant, the number of pulses counted by the elements 30, 32 may be different in each cycle of a constant time interval, even though the speed of the engine shaft remains constant. The variation in the counts obtained by elements 30, 32 under such conditions, when the engine speed remains constant, is disturbing to an observer reading the engine speed from the display 72, 74, since that display will vary correspondingly.

The circuit elements and components shown in the embodiment of the present invention, are conventional elements which are commercially available. Thus, elements 26, 27, 43, 44, 62, and 66 are all equivalent to the RCA circuit component CD 4049. Elements 34, 52, 56, and 64 may all be obtained from the Motorola circuit component or board MC 14013. the counter 50 may be obtained from the Motorola circuit board MC 14521. The elements 30, 32 together with 58, 60, 68, 70 may all be obtained from Texas Instrument circuit boards SN 74143. The digital display readouts 72, 74 are equivalent to Hewlett Packard displays HP 5082-7650.

With further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A speed measuring arrangement comprising, in combination, a source of pulses occurring at a frequency corresponding to a speed to be measured; counting means connected to said source for counting said pulses; means for generating a predetermined time interval connected to said counting means for actuating said counting means so that said pulses are counted only within said time interval; and means connected between said source of pulses and said time interval generating means for starting said time interval only at a predetermined and constant instant of one of said pulses; the number of pulses counted within said time interval being constant for any predetermined magnitude of the speed being measured, said speed being variable over time.

2. The arrangement as defined claim 1 wherein said time interval generating means comprises a source of high frequency pulses generating clock pulses at constant time periods; an auxiliary counting means connected to said source of high frequency pulses and providing an output after a predetermined number of clock pulses have been counted, said predetermined and constant instant on one of said pulses comprising a positive edge of said pulses; storage register means connected to said first-mentioned counting means for storing the contents thereof after having counted pulses from said first-mentioned source of pulses; digital display means connected to said storage register means for displaying visually the contents thereof; said pulses being engine ignition pulses; said counting means comprising binary-coded decimal counting means; means for actuating said storage register means by a signal from said time interval generating means at end of said time interval; means for resetting said first-mentioned counting means after a predetermined time interval from actuating said storage register means; pulse frequency dividing means connected between said source of pulses and said counting means; pulse-shaping means between said source of pulses and said counting means; said means for resetting said first-mentioned counting means after a predetermined time interval for actuating said storage register means comprising delay means so that the contents of said first-mentioned counting means are transferred to said storage means prior to resetting of said first-mentioned counting means.

* * * * *